(12) United States Patent
Fox et al.

(10) Patent No.: US 11,198,565 B2
(45) Date of Patent: Dec. 14, 2021

(54) MULTI-PRESENTATION SLICING CONVEYOR APPARATUS

(71) Applicant: PROVISUR TECHNOLOGIES, INC., Chicago, IL (US)

(72) Inventors: Gage A. Fox, Manhattan, IL (US); Glen F. Pryor, Manhattan, IL (US); Ryan M. Torrenga, Bourbonnais, IL (US); Ryan J. O'Connor, Clarendon Hills, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 15 days.

(21) Appl. No.: 16/714,928

(22) Filed: Dec. 16, 2019

(65) Prior Publication Data

US 2020/0262659 A1 Aug. 20, 2020

Related U.S. Application Data

(60) Provisional application No. 62/807,476, filed on Feb. 19, 2019.

(51) Int. Cl.
*B26D 7/06* (2006.01)
*B65G 15/24* (2006.01)
*B65G 15/50* (2006.01)
*B65G 23/04* (2006.01)
*B65G 47/26* (2006.01)

(52) U.S. Cl.
CPC .......... *B65G 47/266* (2013.01); *B65G 15/50* (2013.01); *B65G 23/04* (2013.01); *B65G 2201/0202* (2013.01)

(58) Field of Classification Search
CPC ........ B65G 15/24; B65G 15/50; B65G 23/04; B65G 47/266; B26D 7/06
USPC ........ 198/607, 633; 83/424, 436.1, 446, 734
See application file for complete search history.

(56) References Cited

U.S. PATENT DOCUMENTS

| | | |
|---|---|---|
| 3,162,226 A | 12/1964 | Toby et al. |
| 3,683,985 A | 8/1972 | Verhoeven |
| 4,436,012 A | 3/1984 | Hochanadel |
| 4,523,505 A | 6/1985 | Polson |
| 4,644,729 A | 2/1987 | Fessler |
| 4,960,025 A | 10/1990 | Fitch |

(Continued)

FOREIGN PATENT DOCUMENTS

JP 2000288983 A 10/2000

OTHER PUBLICATIONS

US 2015/0321372 A!, Fox et al., Nov. 12, 2015.*

(Continued)

*Primary Examiner* — Douglas A Hess
(74) *Attorney, Agent, or Firm* — Klintworth & Rozenblat IP LLP (57) ABSTRACT

A conveyor system includes a frame, a plurality of rollers, a driving mechanism, a plurality of endless belts, and a lifting assembly. The plurality of rollers is rotatably attached to the frame. The driving mechanism is configured to rotate the plurality of rollers. The plurality of endless belts surrounds the plurality of rollers. The lifting assembly includes a plurality of surface and an actuator. The actuator is configured to move the plurality of surfaces between a raised position disposed above the plurality of belts and a lowered position disposed below the plurality of belts.

18 Claims, 11 Drawing Sheets

(56) References Cited

U.S. PATENT DOCUMENTS

| | | | |
|---|---|---|---|
| 5,105,699 A | 4/1992 | Dickson | |
| 5,125,303 A | 6/1992 | Hoyland | |
| 5,207,311 A | 5/1993 | Terai | |
| 5,271,304 A | 12/1993 | Wygal et al. | |
| 5,343,790 A | 9/1994 | Kuhrt | |
| 5,391,386 A | 2/1995 | Mally | |
| 5,426,917 A | 6/1995 | Daane et al. | |
| 5,458,055 A | 10/1995 | Fitch, Jr. | |
| 5,566,600 A | 10/1996 | Johnson et al. | |
| 5,640,897 A | 6/1997 | Fehr | |
| 5,784,937 A | 7/1998 | Wygal et al. | |
| 5,875,697 A | 3/1999 | Cole et al. | |
| 5,974,925 A * | 11/1999 | Lindee | B26D 1/0006 83/403.1 |
| 6,543,325 B1 | 4/2003 | Newhouse et al. | |
| 6,655,248 B1 | 12/2003 | Johnson | |
| 6,758,133 B2 | 7/2004 | Weber | |
| 6,764,750 B1 | 7/2004 | Claycomb | |
| 6,769,337 B2 | 8/2004 | Sandberg et al. | |
| 6,935,215 B2 | 8/2005 | Lindee et al. | |
| 7,089,840 B2 | 8/2006 | Freudinger et al. | |
| 7,270,039 B2 | 9/2007 | Lindee et al. | |
| 7,278,344 B2 | 10/2007 | Pryor et al. | |
| 7,404,481 B2 | 7/2008 | Sandberg et al. | |
| 7,603,936 B2 | 10/2009 | Pryor et al. | |
| 8,250,955 B2 * | 8/2012 | Sandberg | B26D 7/0625 83/435.16 |
| 8,549,966 B2 * | 10/2013 | Hansen | B26D 5/32 83/77 |
| 8,978,529 B2 * | 3/2015 | Pasek | F16P 3/144 83/155 |
| 9,764,490 B2 | 9/2017 | Weber | |
| 9,862,114 B2 * | 1/2018 | Schmeiser | B26D 7/32 |
| 10,160,602 B2 * | 12/2018 | Torrenga | B65G 15/12 |
| 10,245,745 B2 | 4/2019 | Volkl et al. | |
| 10,639,798 B2 * | 5/2020 | Pryor | B26D 7/01 |
| 10,807,266 B2 * | 10/2020 | Mueller | B26D 7/0633 |
| 10,836,063 B2 | 11/2020 | Mayer et al. | |
| 10,836,065 B2 * | 11/2020 | Garcia-Perez | B26D 7/32 |
| 2004/0016331 A1 | 1/2004 | Wolcott et al. | |
| 2004/0149098 A1 | 8/2004 | Freudinger et al. | |
| 2009/0018835 A1 | 1/2009 | Cooper et al. | |
| 2014/0087048 A1 | 3/2014 | Webster et al. | |
| 2017/0312931 A1 | 11/2017 | Volkl et al. | |
| 2019/0191727 A1 | 6/2019 | Volkl et al. | |

OTHER PUBLICATIONS

International Search Report and Written Opinion received for PCT/US2019/066447 dated Apr. 28, 2020.

CashinEDGE Pepperoni Slicer with attachments showing various views of the machine, 4 pages.

JP-2000288983-A English Translation; Oct. 2000 Toa, Yasuhiro B26D7/01.

You Tube Video entitled "Anco Slicer for Pepperoni by Michigan Food Equipment" (user879416) 29Â Jan. 2016 (Jan. 29, 2016) [Retrieved from the internet]< URL:https://www.youtube.com/watch ?v= 1 RSYq91cldk>.

International Preliminary Report on Patentability and Written Opinion for corresponding International Application No. PCT/US2019/066447 dated Sep. 2, 2021, 10 pages.

* cited by examiner

MULTI-PRESENTATION SLICING CONVEYOR APPARATUS

CROSS-REFERENCE TO RELATED APPLICATIONS

This application claims priority to U.S. Provisional Application No. 62/807,476, filed Feb. 19, 2019, entitled "MULTI-PRESENTATION SLICING CONVEYOR APPARATUS", reference of which is hereby incorporated in its entirety.

FIELD OF THE DISCLOSURE

This disclosure relates to food processing systems and apparatus having conveyor systems which allow for the simultaneous processing of food product having differing configurations on the conveyor systems.

BACKGROUND

Food processing systems and apparatus often utilize conveyors to move food product. The conveyors typically are only configured to process the food product in one configuration at a time. For instance, the conveyors may be configured to accumulate stacked food product while the conveyors are stopped, and to accumulate shingled food product while the conveyors are moving.

A system, apparatus, and method are needed to simultaneously process food product having differing configurations on conveyor systems.

SUMMARY

In one embodiment, a conveyor system includes a frame, a plurality of rollers, a driving mechanism, a plurality of endless belts, and a lifting assembly. The plurality of rollers is rotatably attached to the frame. The driving mechanism is configured to rotate the plurality of rollers. The plurality of endless belts surrounds the plurality of rollers. The lifting assembly includes a plurality of surface and an actuator. The actuator is configured to move the plurality of surfaces between a raised position disposed above the plurality of belts and a lowered position disposed below the plurality of belts.

In another embodiment, a food product slicing apparatus includes a frame, a tray, a slicing station, and an accumulating conveyor system. The tray is moveably attached to the frame. The tray includes a plurality of lanes. The slicing station includes a blade disposed downstream of the tray. The accumulating conveyor is disposed below and downstream of the slicing station. The accumulating conveyor system includes a plurality of rollers, a driving mechanism, a plurality of endless belts, and a lifting assembly. The plurality of rollers is rotatably attached to the frame. The driving mechanism is configured to rotate the plurality of rollers. The plurality of endless belts surrounds the plurality of rollers. The lifting assembly includes a plurality of surfaces and an actuator. The actuator is configured to move the plurality of surfaces between a raised position disposed above the plurality of belts and a lowered position disposed below the plurality of belts.

In still another embodiment, a method of processing food product is disclosed. In one step food product is sliced using a slicing station. In another step some of the sliced food product is accumulated from the slicing station in a stationary, stacked presentation on a plurality of surfaces configured in a raised, stationary position above a plurality of rotating endless belts of a conveyor system. In yet another step other of the sliced food product is simultaneously accumulated from the slicing station in a moving, shingled presentation on the plurality of rotating endless belts of the conveyor system.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Figure 3:
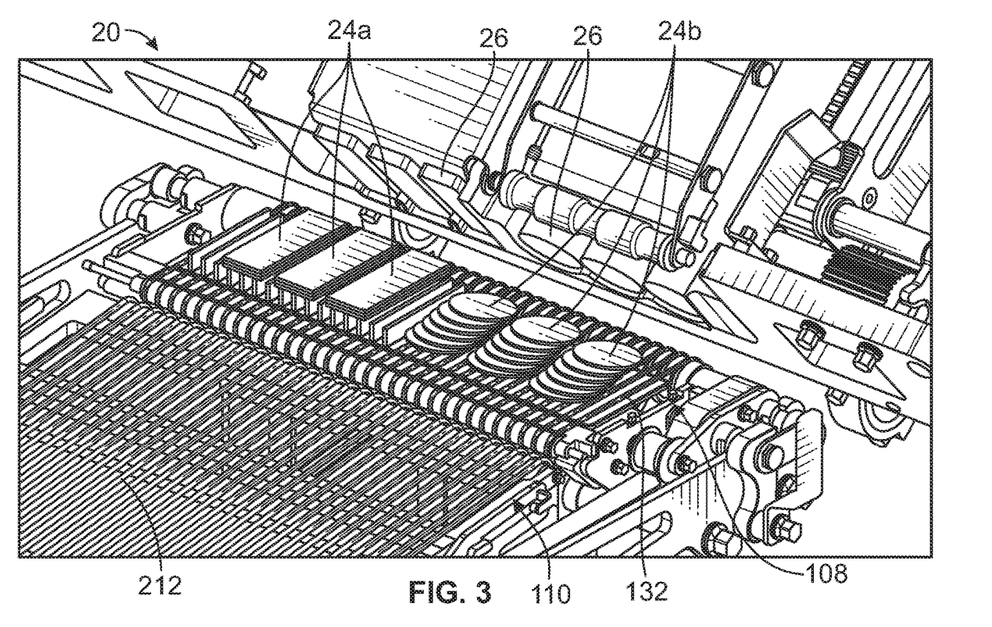
FIG. 3 illustrates the conveyor apparatus of FIG. 2 processing varied configuration food products with the varied configuration food products being disposed on an accumulating conveyor system.
Figure 4:
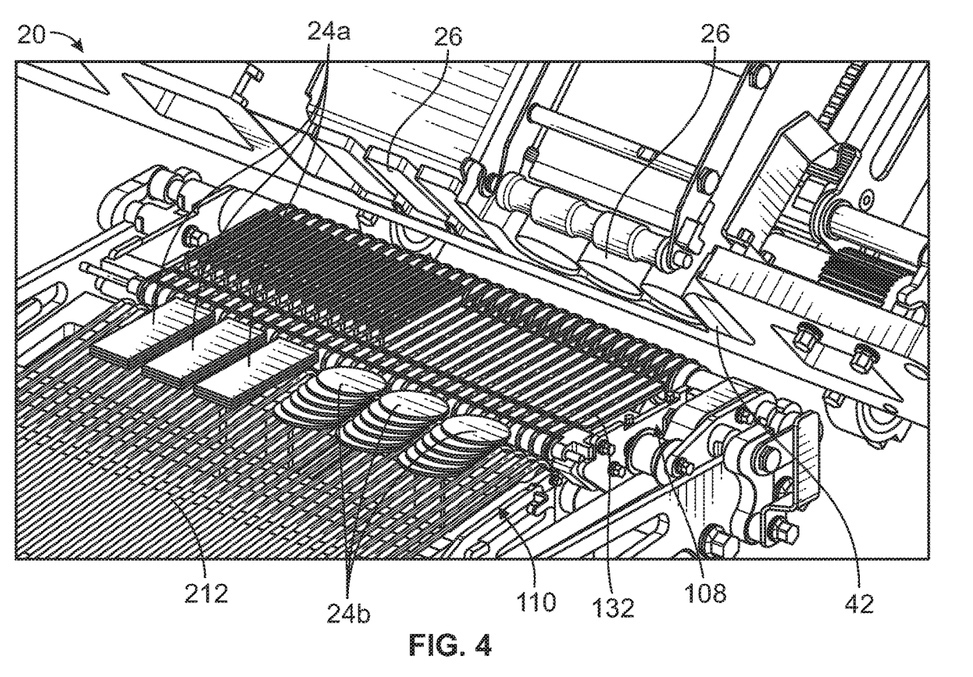
FIG. 4 illustrates the conveyor apparatus of FIG. 3 with the varied configuration food products having been transferred from the accumulating conveyor system to a transfer conveyor system.

As shown in FIGS. 1-4 collectively, the present disclosure provides a conveyor apparatus 20 for a food product slicing apparatus 22 which allows slices of food logs 26 sliced by the food product slicing apparatus 22 to be received in a stacked presentation 24a and in a shingled presentation 24b, see FIG. 3. With reference to the figures, one example of the food product slicing apparatus 22 is shown. The food product slicing apparatus 22 is used to slice multiple elongated food logs 26 at the same time into individual slices to form the stacked presentation 24a and in a shingled presentation 24b. The stacked presentation 24a means that adjacent slices of food product sit directly on top of each other to form a stack. The shingled presentation 24b means that adjacent slices of food product are offset from each other. The multiple food logs 26 may be comprised of a wide variety of edible materials including, but not limited to meat, such as beef, chicken, fish, pork, etc., and cheese. In some examples, the food product logs 26 are frozen.

In some embodiments, each food log 26 is elongated with a circular cross-section, is elongated with a square cross-section, is elongated with an oval cross-section, is elongated with a rectangular cross-section, but not limited to these cross-sectional. In some examples, the food logs 26 are frozen.

Figure 1:
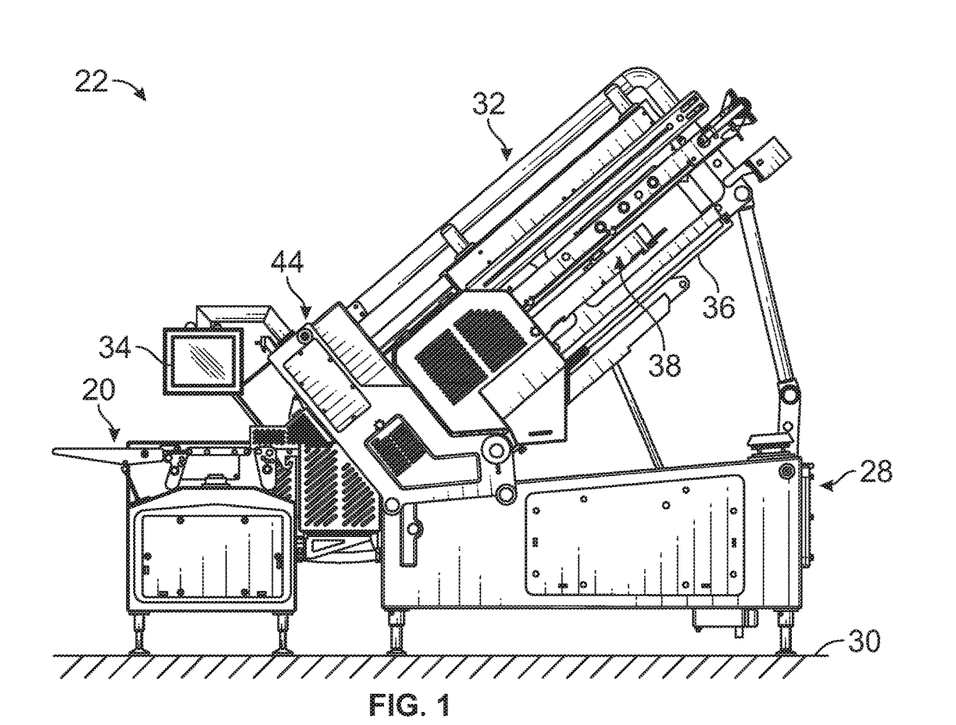
FIG. 1 illustrates a side view of one embodiment of a food processing apparatus.
Figure 2:
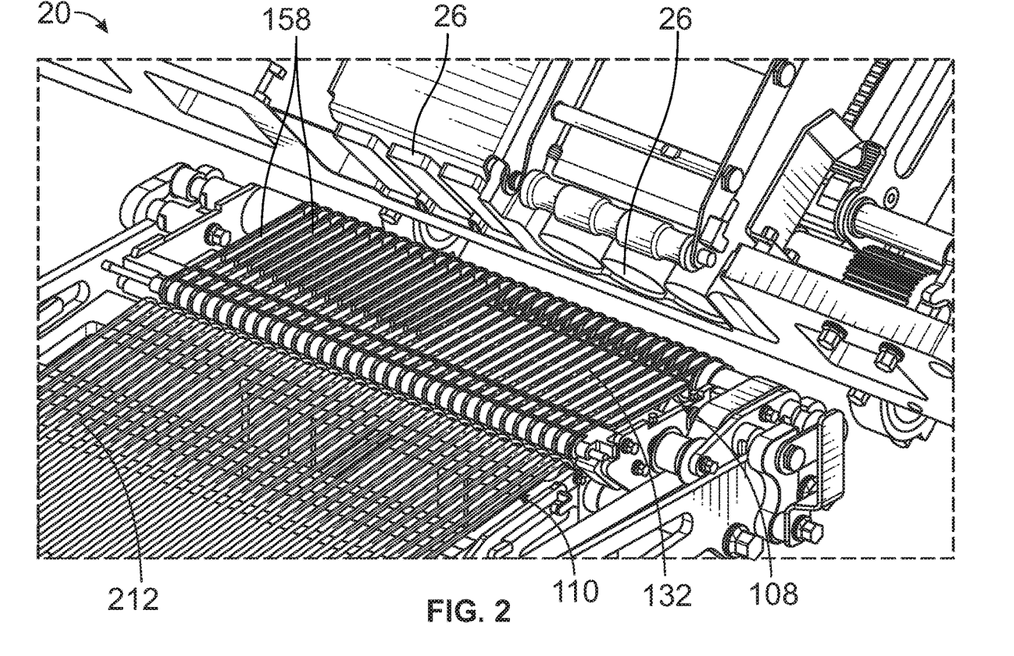
FIG. 2 illustrates a partial top perspective view of one embodiment of a conveyor apparatus of the food processing apparatus of FIG. 1.

The food product slicing apparatus 22 includes a base 28 mounted on a horizontal ground surface 30, an input and slicing portion 32, and a control system 34 configured to control operation of the food product slicing apparatus 22. The base 28 supports the input and slicing portion 32 and the control system 34 on the ground surface 30 and includes various mechanisms and power systems for powering the food product slicing apparatus 22. The input and slicing portion 32 are configured to support and handle the multiple food logs 26, to move the multiple food logs 26 and to slice the multiple food logs 26 into slices to form the stacked presentation 24a and to form the shingled presentation 24b. The conveyor apparatus 20 is attached to the base 28 and is downstream of the input and slicing portion 32. The stacked presentation 24a and the shingled presentation 24b are supported on the conveyor apparatus 20 and are moved away from the input and slicing portion 32 by the conveyor apparatus 20. The control system 34 includes all the necessary hardware and software to perform all of the operations and functions of the food product slicing apparatus 22.

Figure 5:
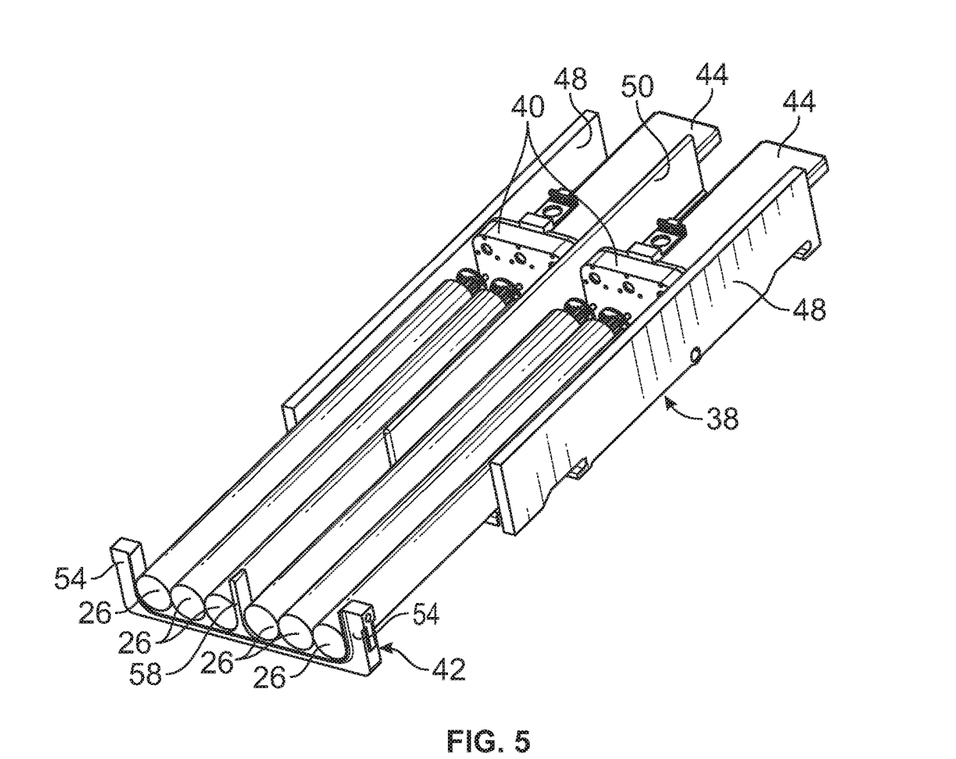
FIG. 5 illustrates a top perspective view of one embodiment of a loaf tray of the food processing apparatus of FIG. 1.
Figure 6:
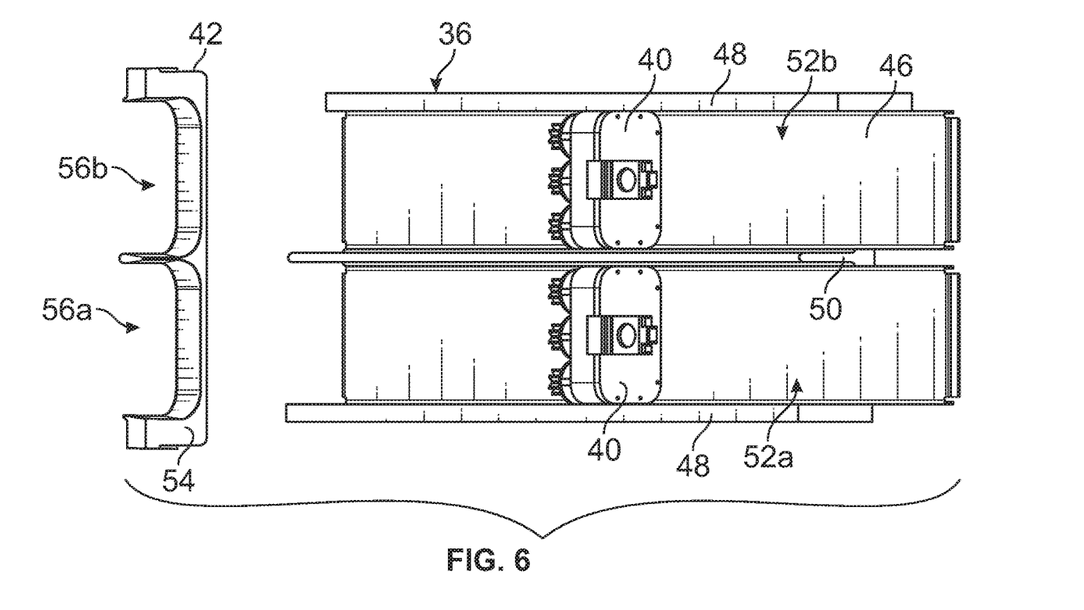
FIG. 6 illustrates a top view of the loaf tray of FIG. 5.
Figure 7:
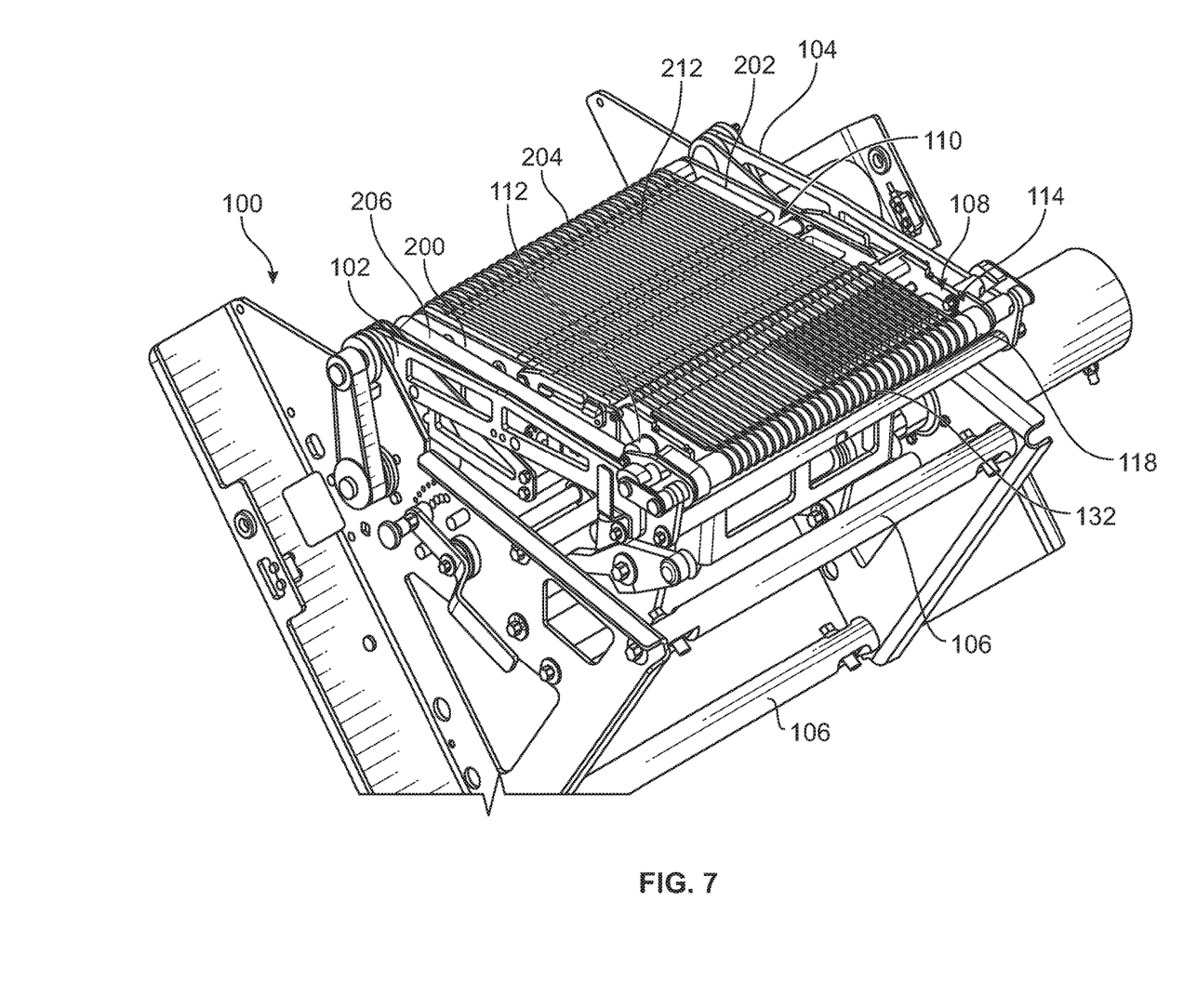
FIG. 7 illustrates a top left side perspective view of the conveyor apparatus of FIG. 2.
Figure 8:
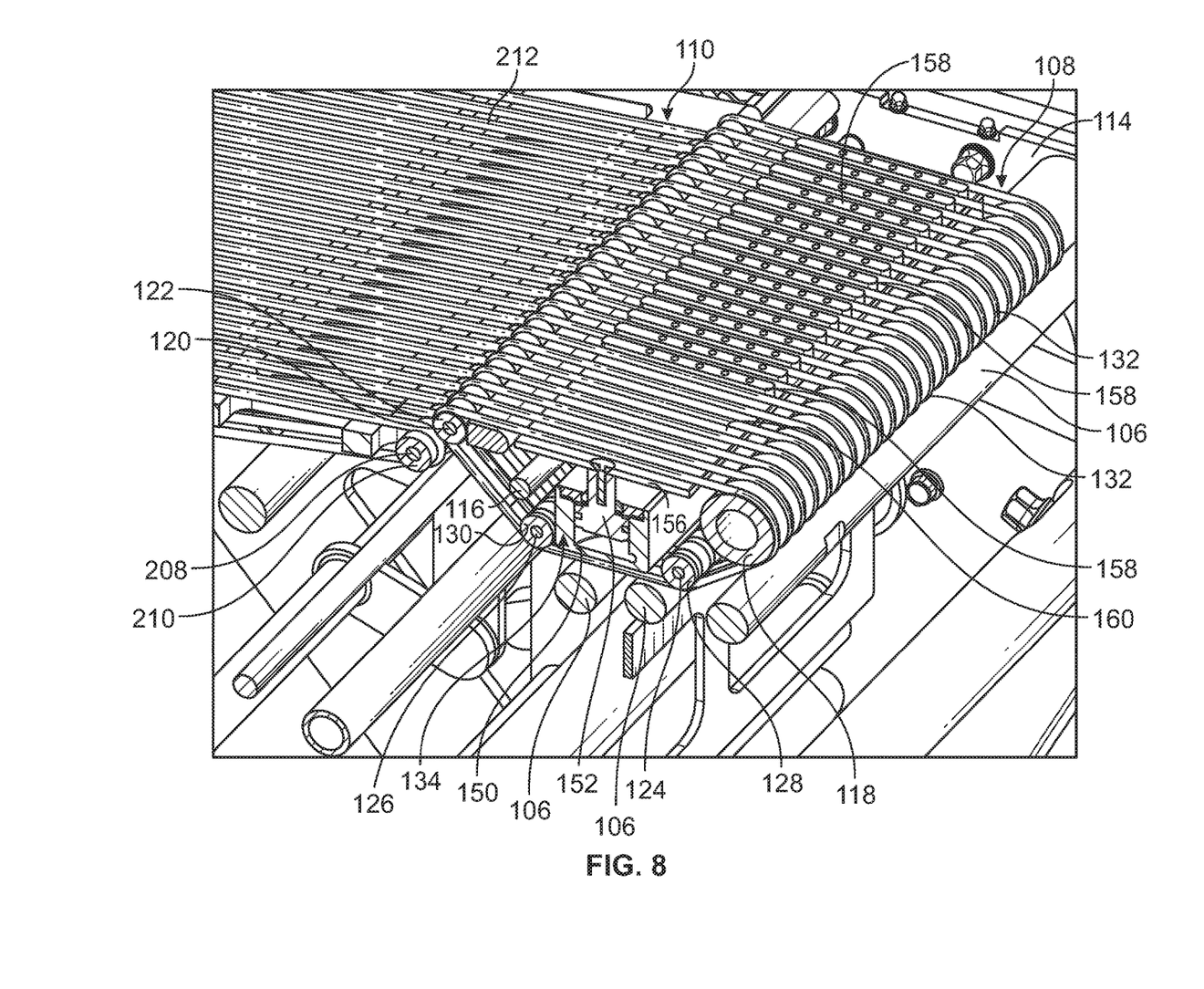
FIG. 8 illustrates a top left side perspective cut-away view of the conveyor apparatus of FIG. 7 with portions of a frame removed to provide a better view.
Figure 9:
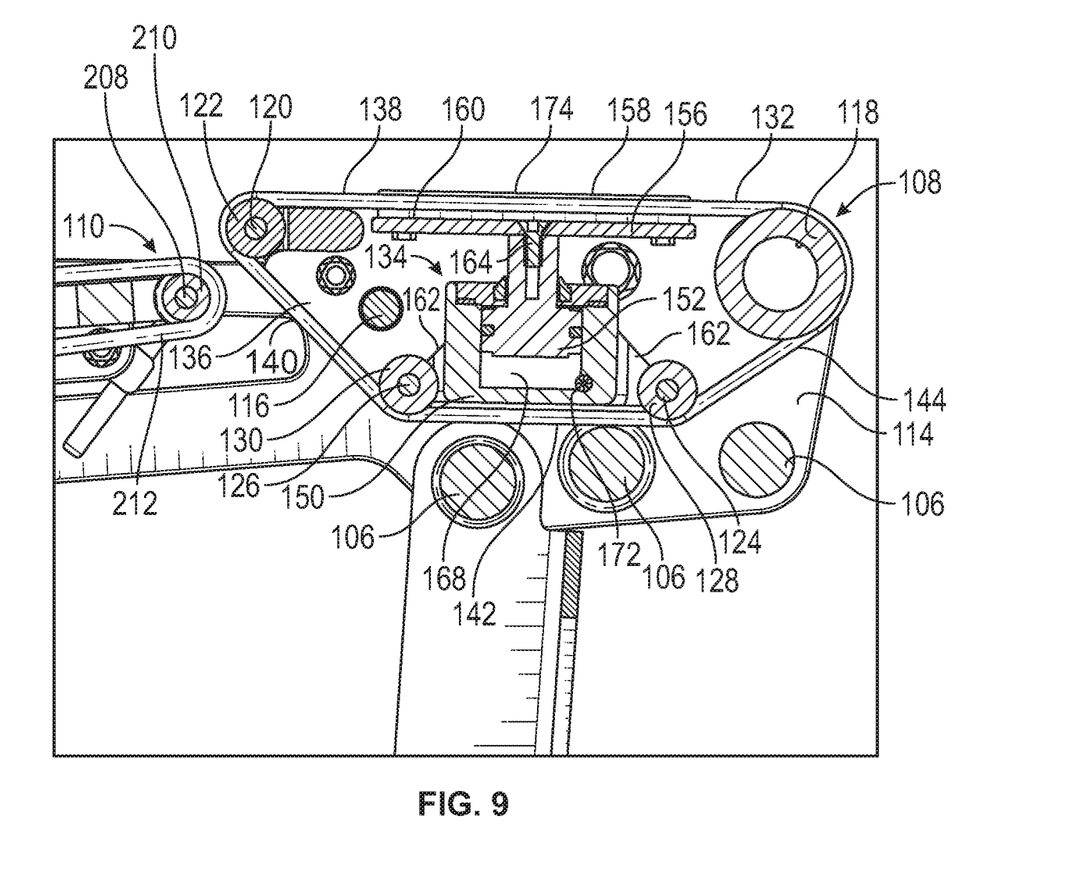
FIG. 9 illustrates a left side cut-away view of the conveyor apparatus of FIG. 8 with portions of the frame removed to provide a better view.
Figure 10:
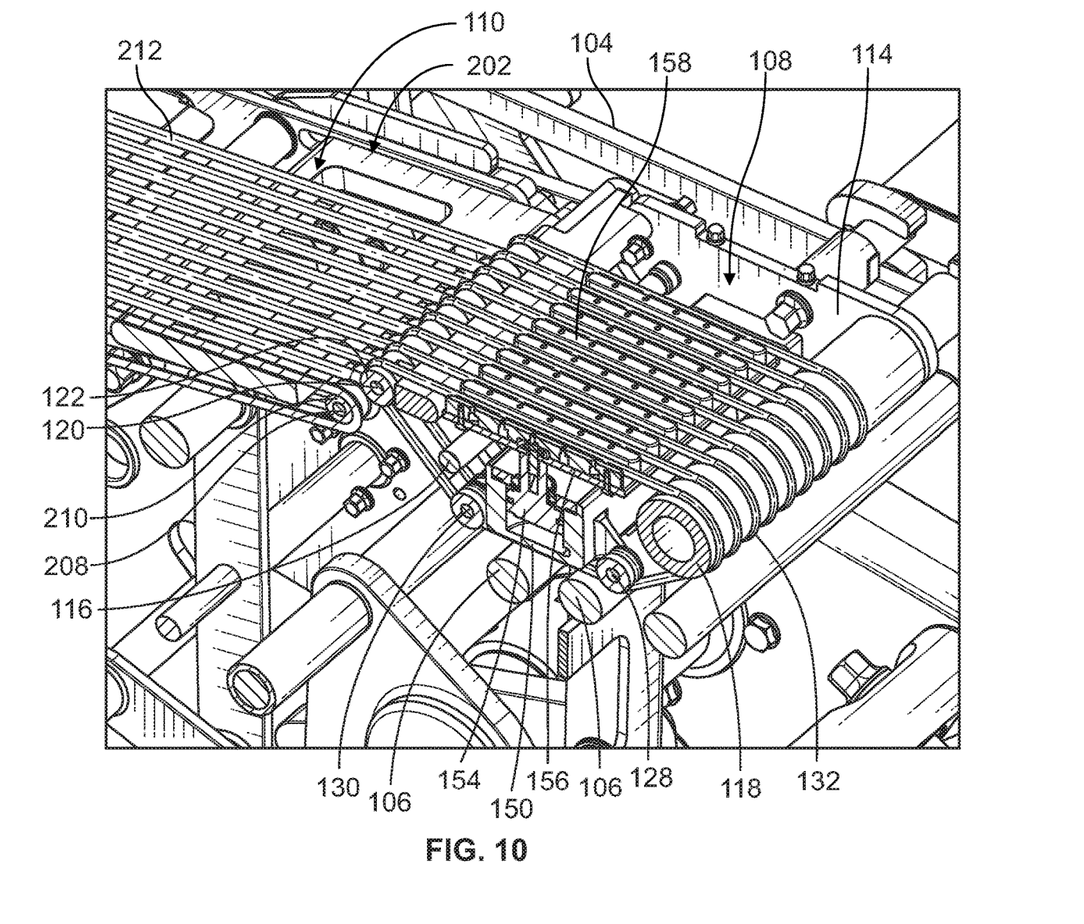
FIG. 10 illustrates a top right-side perspective cut-away view of the conveyor apparatus of FIG. 7 with portions of the frame removed to provide a better view.
Figure 11:
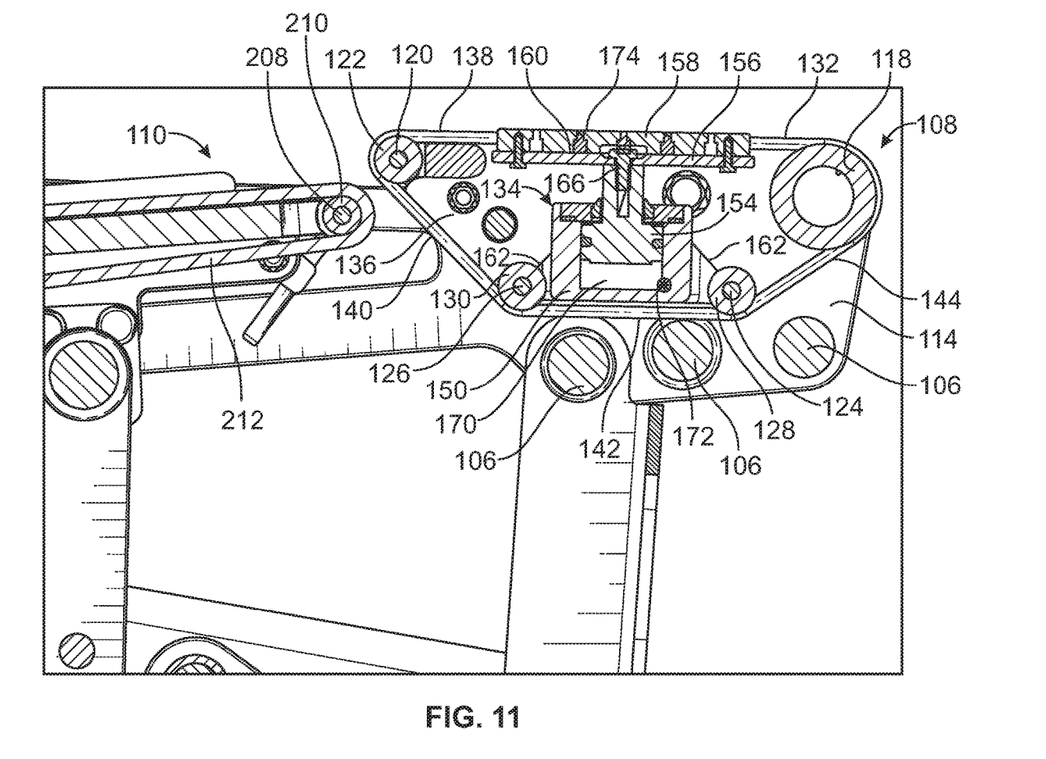
FIG. 11 illustrates a right-side cut-away view of the conveyor apparatus of FIG. 10 with portions of the frame removed to provide a better view.
Figure 12:
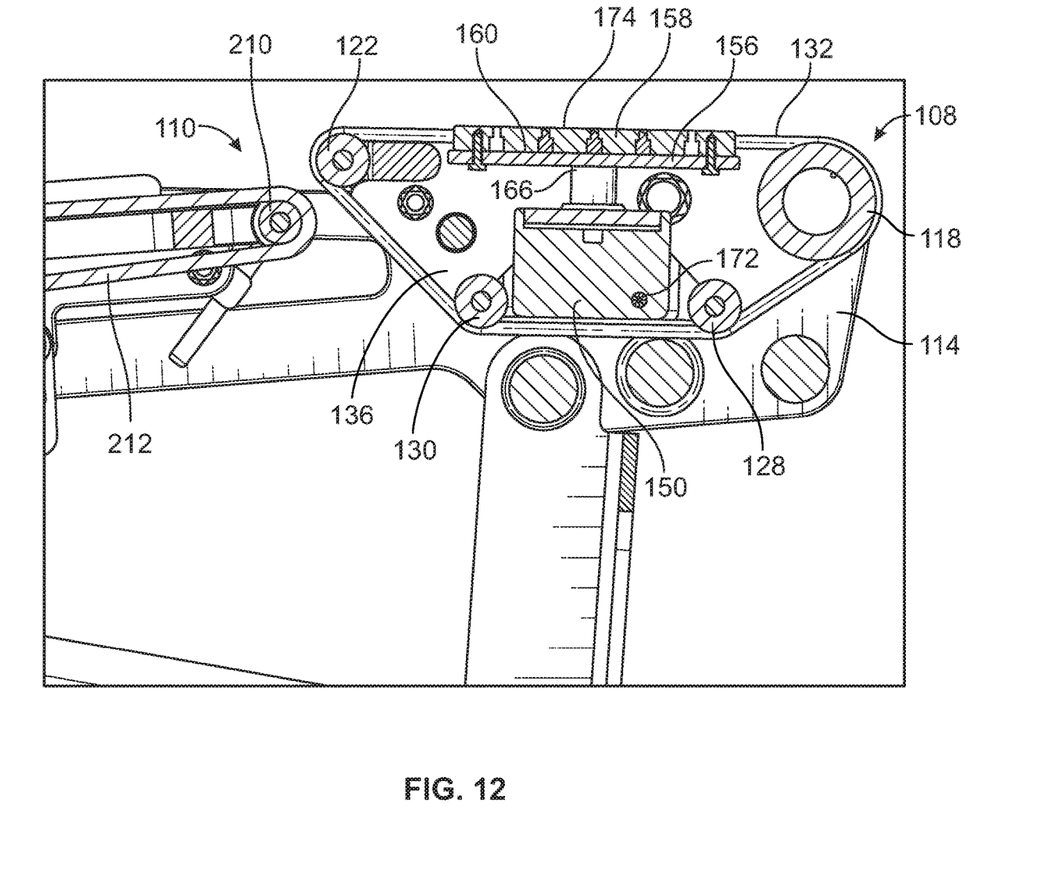
FIG. 12 illustrates a right-side cut-away view, in a different location, of the conveyor apparatus of FIG. 11 with portions of the frame removed to provide a better view.
Figure 13:
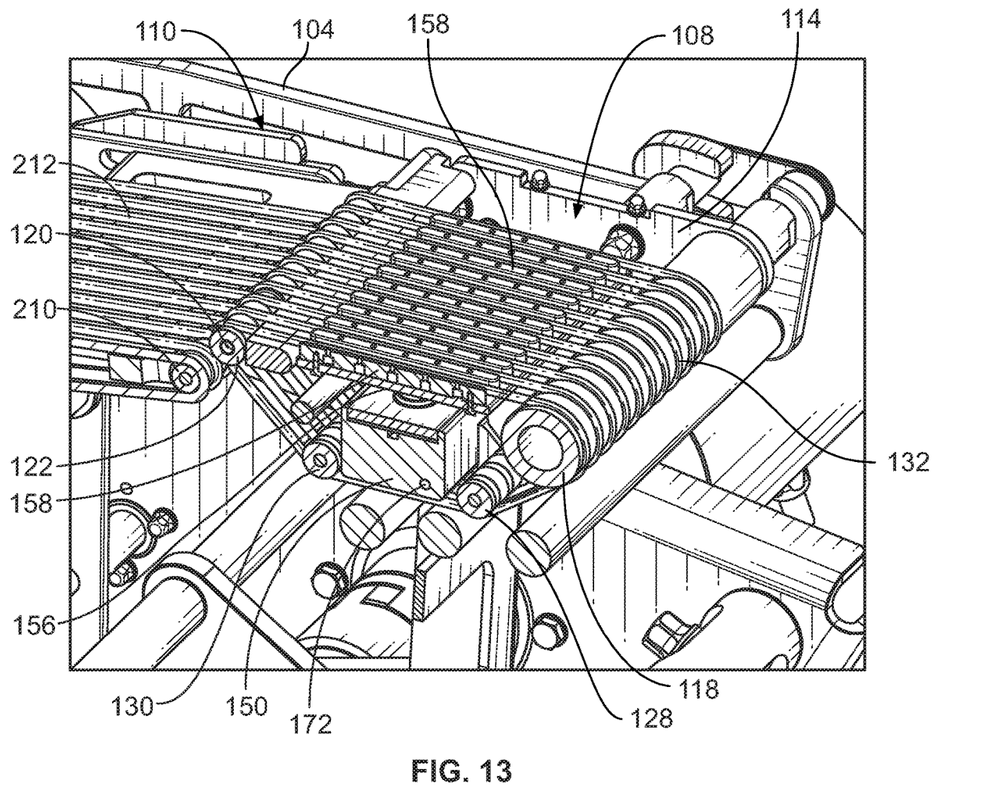
FIG. 13 illustrates a top right-side perspective cut-away view of the conveyor apparatus of FIG. 12 with portions of the frame removed to provide a better view.

With reference to FIGS. 1, 5 and 6, in an example embodiment, the input and slicing portion 32 includes a frame 36, a loaf tray 38 mounted on the frame 36, a drive assembly 40 mounted on the frame 36 above the loaf tray 38 and which is moveable relative to the frame 36 and relative to the loaf tray 38, a shear bar 42 mounted on the frame 36 and which is downstream of the loaf tray 38, a slicing station 44 mounted on the frame 36 and which is downstream of the shear bar 42. The drive assembly 40 moves the multiple food logs 26 along the loaf tray 38 such that the multiple food logs 26 pass through the shear bar 42 and into the slicing station 44 at the same time. The loaf tray 38 is mounted on the base 28 by the frame 36 such that the loaf tray 38 is angled relative to a horizontal plane, for example the ground surface 30. In an example embodiment, the loaf tray 38 includes a base wall 46 on which the food logs 26 seat, upstanding end walls 48 at the outer ends of the base wall 46, and an upstanding dividing wall 50 separating the base wall 46 into lanes 52a, 52b. Multiple food logs 26 can be supported side-by-side in each lane 52a, 52b such that the foods logs 26 in each lane 52a, 52b form a horizontal, side-by-side row of food logs 26. The dividing wall 50 and the end walls 48 may extend along substantially the entire length of the base wall 46. When the food logs 26 are positioned in the lanes 52a, 52b, the upstanding walls forming the respective lane 52a, 52b abut against, or are in close proximity to, the sides of the outermost food log 26.

The drive assembly 40 may take a variety of forms and moves the food logs 26 to the slicing station 44. In an embodiment, the drive assembly 40 is formed of multiple grippers which attach to a rear or upstream end of each food log 26 in the lane 52a, 52b and which are driven by known means, such as a conveyor belt, to cause the food logs 26 to slide along the respective lane 52a, 52b in the loaf tray 38. Such grippers are known in the art. In an embodiment, the drive assembly 40 is formed of a driven continuous conveyor belt which engages and presses down onto the food logs 26, and causes all of the food logs 26 to slide along the respective lane 52a, 52b in the loaf tray 38.

The input and slicing portion 32 could instead be provided by a plurality of separate conveyor belts, and the drive assembly 40 may be formed by grippers attached to each conveyor belt.

The shear bar 42 is formed of an elongated wall 54 having a plurality of separate lanes 56a, 56b which are formed by openings 58 in the wall 54 to guide and position the food logs 26. The wall 54 has an upstream face which faces the loaf tray 38 and an opposite downstream face. At least the downstream face is planar and is angled relative to the base wall 46 of the loaf tray 36. In an embodiment, the downstream face is angled at an angle of 90 degrees relative to the base wall 46 of the loaf tray 38. The lanes 56a, 56b in the shear bar 42 align with the lanes 52a, 52b in the loaf tray 38. Each opening 58 is shaped to accommodate the shape of the row of food logs 26. In an embodiment, each base wall 46 and downstream face is angled relative to the horizontal plane, namely the ground surface 30, at a predetermined angle.

The slicing station 44 is conventional and the specifics are not described herein. The slicing station 44 has a blade which is parallel to the planar downstream face of the shear bar 42 and thus angled relative to the base wall 46 of the loaf tray 38. The blade is large enough to slice all of the food logs 26 into individual slices to form the stacked presentation 24a and to form the shingled presentation 24b as the blade passes therethrough.

FIGS. 7-13 illustrate the conveyor apparatus 20 which collects and transports the stacked presentation 24a and the shingled presentation 24b from the slicing station 44 to a collection site (not shown).

The conveyor apparatus 20 includes a frame 100 having upstanding side walls 102, 104 connected together by a plurality of support rods 106. The frame 100 is optionally mounted upon a plurality of feet (not shown), which may include rollers or wheels.

The conveyor apparatus 20 includes an accumulating conveyor system 108 supported on the frame 100 and a transfer conveyor system 110 supported on the frame 100. The accumulating conveyor system 108 is directly downstream of the slicing blade of the slicing station 44, and the transfer conveyor system 110 is downstream of the accumulating conveyor system 108. The accumulating conveyor system 108 forms a first stage of the conveyor apparatus 20, and the transfer conveyor system 110 forms a second stage of the conveyor apparatus 20. The accumulating conveyor system 108 receives slices of food product from the slicing station 44 and transports the sliced food product to the transfer conveyor system 110.

The accumulating conveyor system 108 has a frame which includes a first side wall 112 connected to the side wall 102 and to the support rods 106 by linkages, a second side wall 114 connected to the side wall 104 and to the support rods 106 by linkages, such that upstream and downstream ends of the side walls 112, 114 are supported, and support rods 106 connected between the side walls 112, 114. The side walls 112, 114 extend longitudinally and are parallel to each other, and are parallel to the side walls 102, 104.

The accumulating conveyor system 108 has a driven roller 118 supported between the upstream end of the side wall 114 and the side wall 102 of the frame 100. The driven roller 118 is rotatable relative to the side walls 102, 114, and is rotated by a suitable driving mechanism, such as a motor. The roller 118 has a plurality of spaced apart channels therein.

The accumulating conveyor system 108 further includes an upper rod 120 having at least one roller 122 thereon, a pair of lower rods 124, 126 having at least one roller thereon 128, 130 thereon, a plurality of endless belts 132 surrounding the rollers 118, 122, 128, 130, and a plate lifting assembly 134 mounted within a cavity 136 formed by the endless belts 132.

The upper rod 120 is affixed to and extends between the first and second side walls 112, 114, is spaced from the driven roller 118, and is downstream of the driven roller 118 and downstream of the plate lifting assembly 134. The upper rod 120 is fixed in position relative to the first and second side walls 112, 114. At least one freely rotatable roller 122 is mounted on the upper rod 120. The roller(s) 122 have a plurality of spaced apart channels therein. The upper surface (s) of the roller(s) 122 is vertically aligned with the upper surface of the driven roller 118, and the channels in the roller(s) 122 align with the channels in the driven roller 118.

The lower rods 124, 126 are spaced apart from each other, and extend between the first and second side walls 112, 114. The lower rods 124, 126 are fixed in position relative to the first and second side walls 112, 114. The lower rod 124 is upstream of the lower rod 126, and downstream of the driven roller 118. The lower rod 126 is downstream of the lower rod 124, and upstream of the roller(s) 122. A plurality of freely rotatable rollers 128, 130 are mounted on the respective lower rods 124, 126. The rollers 128, 130 have a plurality of spaced apart channels therein. The rollers 128, 130 may be vertically aligned with each other, and the channels in the rollers 128, 130 align with the channels in the rollers 118, 122.

An endless belt 132 is seated within the aligned channels of the rollers 118, 122, 128, 130 such that a plurality of endless loops of belts 132 are provided. A first section 138 of each endless belt 132 extends between the driven roller 118 and the upper roller(s) 122. A second section 140 of each endless belt 132 extends between the upper roller(s) 122 and the lower rollers 130. A third section 142 of each endless belt 132 extends between the lower rollers 128, 130. A fourth section 144 of each endless belt 132 extends between the lower rollers 128 and the driven roller 118.

The plate lifting assembly 134 is mounted within the cavity 136 and includes a housing 150 in which a pair of actuators 152, 154 are mounted, a planar lifting plate 156 attached to the actuators 152, 154, and a plurality of support bars 158 extending from an upper surface 160 of the plate 156.

The housing 150 is attached to the lower rods 124, 126 by supports 162 between the rollers 128, 130 such that the housing 150 is fixed in position relative to the first and second side walls 112, 114. The actuators 152, 154 are mounted in the housing 150 and may be air-actuated pistons. Each actuator 152, 154 has an actuating rod 164, 166 which extends upward from the housing 150 and which is affixed to an underside of the plate 156. The actuating rods 164, 166 are activated by a supply of air which is supplied to cavities 168, 170 in the housing 150 below each actuating rod 164, 166 by an air channel 172 that extends from outside of the housing 150 to each cavity 168, 170. The supply of air is provided to the cavities 168, 170 by suitable means, such as a pump which pumps air to the air channel 172 from a source.

The plate 156 is mounted below the first sections 138 of the endless belts 132. In an embodiment, the plate 156 generally extends between the first and second side walls 112, 114. The support bars 158 are attached to a section of the upper surface 160 of the plate 156 and are spaced apart from each other and are parallel to each other. The support bars 158 extend longitudinally and are parallel to the endless belts 132. Each support bar 158 has an upper surface 174 which is parallel to each other. In an embodiment, the support bars 158 are provided on one half of the plate 156. While the plate 156 is shown as generally extending between the first and second side walls 112, 114, and two actuators 152, 154 are shown, the plate 156 may only be provided on one side of the accumulating conveyor system 108, such as, for example, on the left half of the accumulating conveyor system 108 as shown in the drawings, and a single actuator 154 provided to raise and lower the plate 156 and the attached support bars 158 as discussed herein.

The transfer conveyor system 110 includes has a frame which includes a first side wall 200 connected to the side wall 102 and to the support rods 106 by linkages, a second side wall 202 connected to the side wall 104 and to the support rods 106 by linkages, such that upstream and downstream ends of the side walls 200, 202 are supported. The side walls 200, 202 extend longitudinally and are parallel to each other, and are parallel to the side walls 102, 104 and to the side walls 112, 114.

The transfer conveyor system 110 has a driven roller 204 supported between the downstream end of the side walls 200, 202. The driven roller 204 is rotatable relative to the side walls 200, 202, and is rotated by a suitable driving mechanism, such as a motor. The roller 204 has a plurality of spaced apart channels therein. The rollers 118, 204 may be connected to each other by an endless belt 206 and both rollers 118, 204 driven by the same motor. The transfer conveyor system 110 further has a rod 208 having at least one roller 210 thereon, and a plurality of endless belts 212 surrounding the rollers 204, 208. The belts 212 are seated within channels in the rollers 204, 208.

The upstream end of the transfer conveyor system 110 is vertically below the downstream end of the accumulating conveyor system 108.

The accumulating conveyor system 108 can be operated in a first mode in which a plurality of stacks of sliced food product in the stacked presentation 24a are accumulated on the endless belts 132 for transfer to the transfer conveyor system 110. In this first mode, the plate lifting assembly 134 is not activated such that the upper surface 174 of each support bar 158 is below the first section 138 of the endless belts 132. The roller 118 is not driven, and as a result the endless belts 132 remain stationary. As sliced food product is ejected from the slicing station 44, the sliced food product is accumulated on the endless belts 132 in the stacked presentation 24a. After the desired number of slices are in each stack, the roller 118 is driven to cause rotation of the endless belts 132 and to move the stacks onto the transfer conveyor system 110. When the stacks in the stacked presentation 24a reach the downstream end of the accumulating conveyor system 108, the stacks in the stacked presentation 24a fall onto the endless belts 212 of the transfer conveyor system 110 and are conveyed along the transfer conveyor system 110 for further processing.

The accumulating conveyor system 108 can be operated in a second mode in which a plurality of slices of food product in the shingled presentation 24b are accumulated on the endless belts 132 for transfer to the transfer conveyor system 110. In this second mode, the plate lifting assembly 134 is not activated such that the upper surface 174 of each support bar 158 is below the first section 138 of the endless belts 132. The roller 118 is driven to cause rotation of the endless belts 132 and as sliced food product is ejected from the slicing station 44, the sliced food product is accumulated on the endless belts 132 in the shingled presentation 24b. When the sliced food products in the shingled presentation 24b reach the downstream end of the accumulating conveyor system 108, the sliced food products in the shingled presentation 24b fall onto the endless belts 212 of the transfer conveyor system 110 in the shingled presentation 24b and are conveyed along the transfer conveyor system 110 for further processing.

The accumulating conveyor system 108 can be operated in a third mode in which a plurality of stacks of sliced food product are accumulated on the endless belts 132 in the stacked presentation 24a for transfer to the transfer conveyor system 110, and a plurality of shingles of sliced food product are accumulated on the endless belts 132 in the shingled presentation 24b for transfer to the transfer conveyor system 110. The actuators 152, 154 are actuated to vertically lift the plate 156 and the support bars 158, such that respective support bars 158 extend between adjacent first sections 138 of the endless belts 132. The upper surface 160 of the plate 156 does not contact the lower surfaces of the first sections 138 of the endless belts 132. The upper surfaces 174 of the support bars 158 are vertically higher than the upper surfaces of the first sections 138 of the endless belts 132. The roller 118 is driven to cause rotation of the endless belts 132. As sliced food product is ejected from the slicing station 44, the sliced food product is accumulated on the support bars 158 above the endless belts 132 in the stacked presentation 24a where the support bars 158 are provided, and the sliced food product is accumulated on the endless belts 132 in the shingled presentation 24a where the support bars 158 are not provided. When the sliced food products in the shingled presentation 24b reach the downstream end of the accumulating conveyor system 108, the sliced food products in the shingled presentation 24b fall onto the endless belts 212 of the transfer conveyor system 110 in the shingled presentation 24b and are conveyed along the transfer conveyor system 110 for further processing. After the desired number of slices are in each stack in the stacked presentation 24a, the actuators 152, 154 are actuated to vertically lower the plate 156 and the support bars 158, such that the upper surfaces 174 of the support bars 158 are below the first sections 138 of the endless belts 132. This deposits the stacks in the stacked presentation 24a onto the rotating endless belts 132 and the endless belts 132 move the stacks in the stacked presentation 24a toward transfer conveyor system 110. When the sliced food products in the stacked presentation 24a reach the downstream end of the accumulating conveyor system 108, the sliced food products in the stacked presentation 24a fall onto the endless belts 212 of the transfer conveyor system 110 in the stacked presentation 24a and are conveyed along the transfer conveyor system 110 for further processing.

Figure 14:
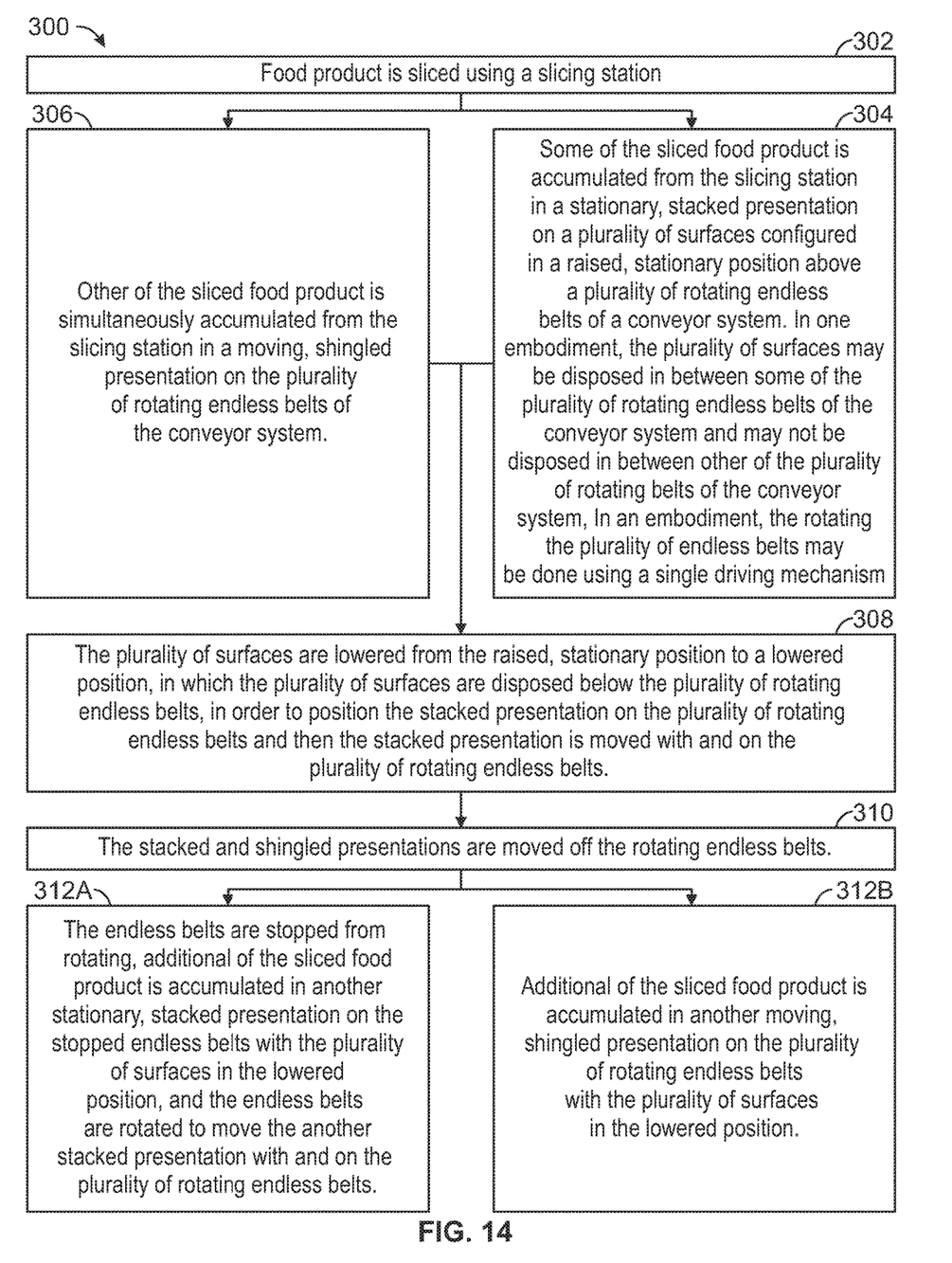
FIG. 14 illustrates a flowchart showing one embodiment of a method of processing food product.

FIG. 14 illustrates a flowchart showing one embodiment of a method 300 of processing food product. The method 300 may use any of the systems or apparatus disclosed herein. In other embodiments, varying systems or apparatus may be used.

In step 302 food product is sliced using a slicing station. In step 304 some of the sliced food product is accumulated from the slicing station in a stationary, stacked presentation on a plurality of surfaces configured in a raised, stationary position above a plurality of rotating endless belts of a conveyor system. In one embodiment, the plurality of surfaces may be disposed in between some of the plurality of rotating endless belts of the conveyor system and may not be disposed in between other of the plurality of rotating endless belts of the conveyor system. In an embodiment, the rotating the plurality of endless belts may be done using a single driving mechanism.

In step 306, which may take place simultaneously as step 304, other of the sliced food product is simultaneously accumulated from the slicing station in a moving, shingled presentation on the plurality of rotating endless belts of the conveyor system.

In step 308 the plurality of surfaces are lowered from the raised, stationary position to a lowered position, in which the plurality of surfaces are disposed below the plurality of rotating endless belts, in order to position the stacked presentation on the plurality of rotating endless belts and then the stacked presentation is moved with and on the plurality of rotating endless belts.

In step 310 the stacked and shingled presentations are moved off the rotating endless belts.

In step 312A the endless belts are stopped from rotating, additional of the sliced food product is accumulated in another stationary, stacked presentation on the stopped endless belts with the plurality of surfaces in the lowered position, and the endless belts are rotated to move the another stacked presentation with and on the plurality of rotating endless belts.

In step 312B additional of the sliced food product is accumulated in another moving, shingled presentation on the plurality of rotating endless belts with the plurality of surfaces in the lowered position.

In other embodiments of the method 300, one or more steps of the method may be varied in substance or in order, one or more additional steps may be added in any order, and/or one or more of the steps may not be followed.

One or more embodiments of the disclosure provide a system, apparatus, and method which are configured to simultaneously process food product having differing configurations on the same conveyor system and apparatus.

Many modifications and other embodiments of the disclosure set forth herein will come to mind to one skilled in the art to which these disclosed embodiments pertain having the benefit of the teachings presented in the foregoing descriptions and the associated drawings.

It is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

The invention claimed is:

1. A food product slicing apparatus comprising:
a frame;
a tray moveably attached to the frame, the tray comprising a plurality of lanes;
a slicing station comprising a blade disposed downstream of the tray; and
an accumulating conveyor system disposed below and downstream of the slicing station, the accumulating conveyor system comprising:
a plurality of rollers rotatably attached to the frame;
a driving mechanism configured to rotate the plurality of rollers;
a plurality of endless belts surrounding the plurality of rollers; and
a lifting assembly comprising a plurality of support bars and an actuator, each support bar having an upper surface, the support bars being disposed between adjacent ones of the endless belts, the actuator configured to move the plurality of upper surfaces between a raised position disposed above the plurality of belts and a lowered position disposed below the plurality of belts.

2. The food product slicing apparatus of claim 1 wherein the driving mechanism comprises a motor.

3. The food product slicing apparatus of claim 1 wherein one of the plurality of rollers comprises a driven roller which is configured to be rotated by the driving mechanism, the driven roller configured to rotate the plurality of endless belts, and the endless belts configured to rotate the rest of the plurality of rollers.

4. The food product slicing apparatus of claim 1 wherein the lifting assembly comprises a plate, the plurality of support bars attached to an upper surface of the plate, the actuator configured to move the plate in order to move the plurality of surfaces between the raised position and the lowered position.

5. The food product slicing apparatus of claim 1 further comprising a transfer conveyor system disposed downstream of the accumulating conveyor system.

6. The food product slicing apparatus of claim 5 wherein the transfer conveyor system is disposed below the accumulating conveyor system.

7. A food product slicing apparatus comprising:
a frame;
a tray moveably attached to the frame, the tray comprising a plurality of lanes;
a slicing station comprising a blade disposed downstream of the tray; and
an accumulating conveyor system disposed below and downstream of the slicing station, the accumulating conveyor system comprising:
a plurality of rollers rotatably attached to the frame;
a driving mechanism configured to rotate the plurality of rollers;
a plurality of endless belts surrounding the plurality of rollers; and
a lifting assembly comprising a plurality of surfaces and an actuator, the actuator configured to move the plurality of surfaces between a raised position disposed above the plurality of belts and a lowered position disposed below the plurality of belts, wherein the plurality of surfaces are disposed between some of the plurality of endless belts and are not disposed between the rest of the plurality of endless belts.

8. The food product slicing apparatus of claim 7 wherein the lifting assembly comprises a plate, the plurality of support bars attached to an upper surface of the plate, the actuator configured to move the plate in order to move the plurality of surfaces between the raised position and the lowered position.

9. The food product slicing apparatus of claim 7 wherein the driving mechanism comprises a motor.

10. The food product slicing apparatus of claim 7 wherein one of the plurality of rollers comprises a driven roller which is configured to be rotated by the driving mechanism, the driven roller configured to rotate the plurality of endless belts, and the endless belts configured to rotate the rest of the plurality of rollers.

11. The food product slicing apparatus of claim 7 further comprising a transfer conveyor system disposed downstream of the accumulating conveyor system.

12. The food product slicing apparatus of claim 11 wherein the transfer conveyor system is disposed below the accumulating conveyor system.

13. A method of processing food product comprising:
slicing food product using a slicing station;
accumulating some of the sliced food product from the slicing station in a stationary, stacked presentation on a plurality of surfaces configured in a raised, stationary position above a plurality of rotating endless belts of a conveyor system; and
simultaneously accumulating other of the sliced food product from the slicing station in a moving, shingled presentation on the plurality of rotating endless belts of the conveyor system.

14. The method of claim 13 wherein the plurality of surfaces are disposed in between some of the plurality of rotating endless belts of the conveyor system and are not disposed in between other of the plurality of rotating endless belts of the conveyor system.

15. The method of claim 13 further comprising lowering the plurality of surfaces from the raised, stationary position to a lowered position, in which the plurality of surfaces are disposed below the plurality of rotating endless belts, in order to position the stacked presentation on the plurality of rotating endless belts and then moving the stacked presentation with and on the plurality of rotating endless belts.

16. The method of claim 15 further comprising moving the stacked and shingled presentations off the rotating endless belts, stopping the endless belts from rotating, accumulating additional of the sliced food product in another stationary, stacked presentation on the stopped endless belts with the plurality of surfaces in the lowered position, and then rotating the endless belts to move the another stacked presentation with and on the plurality of rotating endless belts.

17. The method of claim 15 further comprising moving the stacked and shingled presentations off the rotating endless belts, and accumulating additional of the sliced food product in another moving, shingled presentation on the plurality of rotating endless belts with the plurality of surfaces in the lowered position.

18. The method of claim 13 wherein the rotating the plurality of endless belts is done using a single driving mechanism.

\* \* \* \* \*